(12) United States Patent
Bulatowicz

(10) Patent No.: US 9,612,256 B2
(45) Date of Patent: Apr. 4, 2017

(54) RANGE-DEPENDENT BIAS CALIBRATION OF AN ACCELEROMETER SENSOR SYSTEM

(71) Applicant: Michael D. Bulatowicz, Canoga Park, CA (US)

(72) Inventor: Michael D. Bulatowicz, Canoga Park, CA (US)

(73) Assignee: Northrop Grumman Guidance and Electronics Company, Inc., Woodland Hills, CA (US)

( * ) Notice: Subject to any disclaimer, the term of this patent is extended or adjusted under 35 U.S.C. 154(b) by 523 days.

(21) Appl. No.: 13/951,000

(22) Filed: Jul. 25, 2013

(65) Prior Publication Data

US 2014/0236522 A1 Aug. 21, 2014

Related U.S. Application Data

(63) Continuation-in-part of application No. 13/771,792, filed on Feb. 20, 2013.

(51) Int. Cl.
*G01P 21/00* (2006.01)
*G01P 15/125* (2006.01)
(Continued)

(52) U.S. Cl.
CPC ............ *G01P 21/00* (2013.01); *G01P 15/125* (2013.01); *G01P 15/131* (2013.01); *G01P 2015/0828* (2013.01)

(58) Field of Classification Search
CPC ........ G01P 21/00; G01P 15/125; G01P 15/18; G01P 15/08; G01C 25/005; G01C 25/00
(Continued)

(56) References Cited

U.S. PATENT DOCUMENTS

| 4,862,394 A | 8/1989 | Thompson et al. |
| 5,277,053 A * | 1/1994 | McLane ................ G01P 15/131 |
| | | 702/109 |

(Continued)

FOREIGN PATENT DOCUMENTS

| JP | 2005 500540 | 1/2005 |
| WO | WO 2005069016 A1 * | 7/2005 .......... G01P 15/0802 |

(Continued)

OTHER PUBLICATIONS

European Search Report for corresponding EP 14 15 2754, completed Jun. 2, 2014.

*Primary Examiner* — Peter Macchiarolo
*Assistant Examiner* — Mohammed E Keramet-Amircolai
(74) *Attorney, Agent, or Firm* — Tarolli, Sundheim, Covell & Tummino LLP

(57) ABSTRACT

One embodiment of the invention includes an accelerometer sensor system. The system includes a sensor comprising a proofmass and electrodes and being configured to generate acceleration feedback signals based on control signals applied to the electrodes in response to an input acceleration. The system also includes an acceleration component configured to measure the input acceleration based on the acceleration feedback signals. The system further includes an acceleration controller configured to generate the control signals to define a first scale-factor range associated with the sensor and to define a second scale-factor range associated with the sensor. The control system includes a calibration component configured to calibrate the accelerometer sensor system with respect to range-dependent bias error based on a difference between the measured input acceleration at each of the first scale-factor range and the second scale-factor range.

20 Claims, 3 Drawing Sheets

(51) Int. Cl.
*G01P 15/13* (2006.01)
*G01P 15/08* (2006.01)

(58) Field of Classification Search
USPC .............................. 73/1.38, 514.35; 702/141
See application file for complete search history.

(56) References Cited

U.S. PATENT DOCUMENTS

| | | | | |
|---|---|---|---|---|
| 5,526,263 | A * | 6/1996 | Tanaka | B60T 8/172 |
| | | | | 701/70 |
| 5,596,144 | A * | 1/1997 | Swanson | G01P 15/123 |
| | | | | 73/514.17 |
| 6,636,819 | B1 * | 10/2003 | Abbott | G01P 15/097 |
| | | | | 702/124 |
| 7,066,004 | B1 * | 6/2006 | Kohler | G01C 19/5719 |
| | | | | 702/88 |
| 7,707,867 | B2 * | 5/2010 | Babala | G01C 21/16 |
| | | | | 73/1.38 |
| 2005/0172715 | A1 | 8/2005 | Babala | |
| 2009/0066641 | A1 | 3/2009 | Mahajan et al. | |
| 2009/0241662 | A1 * | 10/2009 | Supino | G01C 19/5719 |
| | | | | 73/504.12 |
| 2010/0063763 | A1 * | 3/2010 | Rozelle | G01C 19/5691 |
| | | | | 702/92 |
| 2012/0265481 | A1 * | 10/2012 | Stewart | G01P 15/131 |
| | | | | 702/141 |
| 2012/0274560 | A1 | 11/2012 | Caritu et al. | |
| 2014/0074418 | A1 * | 3/2014 | Lin | G01P 21/00 |
| | | | | 702/96 |

FOREIGN PATENT DOCUMENTS

| | | |
|---|---|---|
| WO | WO 2010/119046 A2 | 10/2010 |
| WO | WO 2012/151360 A2 | 11/2012 |

* cited by examiner

RANGE-DEPENDENT BIAS CALIBRATION OF AN ACCELEROMETER SENSOR SYSTEM

RELATED APPLICATIONS

The present invention is a Continuation-In-Part application that claims priority from U.S. patent application Ser. No. 13/771,792, entitled "RANGE-DEPENDENT BIAS CALIBRATION OF AN ACCELEROMETER SENSOR SYSTEM", filed Feb. 20, 2013, which is incorporated herein by reference in its entirety.

TECHNICAL FIELD

This disclosure relates generally to sensor systems, and specifically to range-dependent bias calibration of an accelerometer sensor system.

BACKGROUND

In a force balanced sensing instrument, such as an accelerometer for example, it is generally desired that the instrument output signal be proportional to the input condition to be sensed. Therefore, in many types of electrostatic and electromagnetic force balanced sensing instruments special techniques are required to obtain a linear relation between the instrument output and the sensed input. In electrostatic and electromagnetic instruments, the forces applied by the instrument forcer are not linearly related to the feedback voltage or current supplied to the forcer. Furthermore, for optimum operation of the instrument itself it is preferred that the feedback force applied by the feedback control network have a linear relation to the sensed input. Thus, special techniques have been employed for obtaining such linearity.

As one example, in an electrostatic force balanced accelerometer, electrostatic forcing in a closed loop system is employed to position and obtain an output from a pendulous inertial mass or proof mass. The electrostatic forcing system employs a capacitive pickoff electrode on each side of a pendulous member that has been etched from a silicon substrate. A control pulse is employed to sequentially apply a constant amount of charge to each electrode. A variable force is applied to the inertial mass by varying the amount of time (e.g., duty cycle) the charge is left on a respective plate. The amount of time the charge is left on a respective plate is based on the displacement of the inertial mass relative to a null position.

Accelerometer scale-factor and bias uncertainty can be major sources of error in inertial measurement and/or navigation systems. Bias uncertainty can arise due to transient behavior at turn on, non-modelability, and instability of bias versus temperature characteristics including hysteresis and can simply trend over time. Scale-factor errors can result from a variety of sources, such as effects arising from non-uniform electrical charge distribution, sensing signal asymmetry, material considerations, and environmental conditions. Mitigation of accelerometer scale-factor and bias uncertainty, particularly in a dynamic environment, could significantly improve the performance of inertial measurement and navigation systems.

SUMMARY

One embodiment of the invention includes an accelerometer sensor system. The system includes a sensor comprising a proofmass and electrodes and being configured to generate acceleration feedback signals based on control signals applied to the electrodes in response to an input acceleration. The system also includes an acceleration component configured to measure the input acceleration based on the acceleration feedback signals. The system further includes an acceleration controller configured to generate the control signals to define a first scale-factor range associated with the sensor and to define a second scale-factor range associated with the sensor. The control system includes a calibration component configured to calibrate the accelerometer sensor system with respect to range-dependent bias error based on a difference between the measured input acceleration at each of the first scale-factor range and the second scale-factor range.

Another embodiment of the invention includes a method for calibrating an accelerometer sensor system. The method includes measuring an input acceleration acting upon a sensor associated with the accelerometer sensor system in a first scale-factor range. The method also includes adjusting a scale-factor range of the accelerometer sensor system from the first scale-factor range to a second scale-factor range. The method also includes measuring the input acceleration acting upon the sensor in the second scale-factor range. The method further includes implementing an algorithm based on a difference of the measurements of the input acceleration in the respective first and second scale-factor ranges to calculate an estimated range-dependent bias error upon which the measured input acceleration is based.

Another embodiment of the invention includes an accelerometer sensor system. The system includes a sensor comprising a proofmass and electrodes and being configured to generate acceleration feedback signals based on control signals applied to the electrodes in response to an input acceleration. The system also includes an acceleration component configured to measure the input acceleration based on the acceleration feedback signals and an estimated range-dependent bias error. The system further includes an acceleration controller configured to generate the control signals to define a first scale-factor range associated with the sensor and to define a second scale-factor range associated with the sensor, the control system comprising a calibration component configured to substantially continuously calibrate the accelerometer sensor system with respect to range-dependent bias error by calculating the estimated range-dependent bias error in real-time based on a difference between the measured input acceleration at each of the first scale-factor range and the second scale-factor range and subtracting the estimated range-dependent bias error from the measured input acceleration.

DETAILED DESCRIPTION

This disclosure relates generally to sensor systems, and specifically to range-dependent bias calibration of an accelerometer sensor system. An accelerometer sensor system can include a sensor that comprises a pendulous proofmass and a set of electrodes (e.g., on either side of the proofmass). The sensor can provide acceleration feedback signals in response to control signals that are provided to the proofmass and/or electrodes in response to an input acceleration. The accelerometer sensor system also includes an acceleration component that is configured to calculate a magnitude of the input acceleration acting upon the accelerometer system based on the acceleration feedback signals and based on an estimated scale-factor dependent bias error. As an example, the acceleration component can be configured to subtract the estimated scale-factor dependent bias error from the calculated input acceleration to substantially mitigate the bias error from the calculated input acceleration. The accelerometer sensor system further includes an accelerometer controller that is configured to generate the control signals in each of a first scale-factor range and a second scale-factor range associated with the sensor, and includes a calibration component that is configured to calibrate the accelerometer sensor system based on a difference in the measured input acceleration at each of the first and second scale-factor ranges.

During operation of the accelerometer sensor system, the accelerometer can substantially continuously implement self-calibration in real-time. As an example, the self-calibration can include periodically alternating between the two scale-factor ranges. In each of the scale-factor ranges, the accelerometer sensor system can measure the input acceleration, and the calibration component can implement an algorithm based on the measured input accelerations to calculate the estimated range-dependent bias error. The estimated range-dependent bias error can thus be implemented in future measurements of the input acceleration, and can be continuously updated by the calibration component to substantially maintain the magnitude of the estimated range-dependent bias error at approximately zero. Accordingly, the measurement of the input acceleration can be performed substantially without errors resulting from the range-dependent bias error, and without interrupting the real-time function of the accelerometer sensor system.

Figure 1:
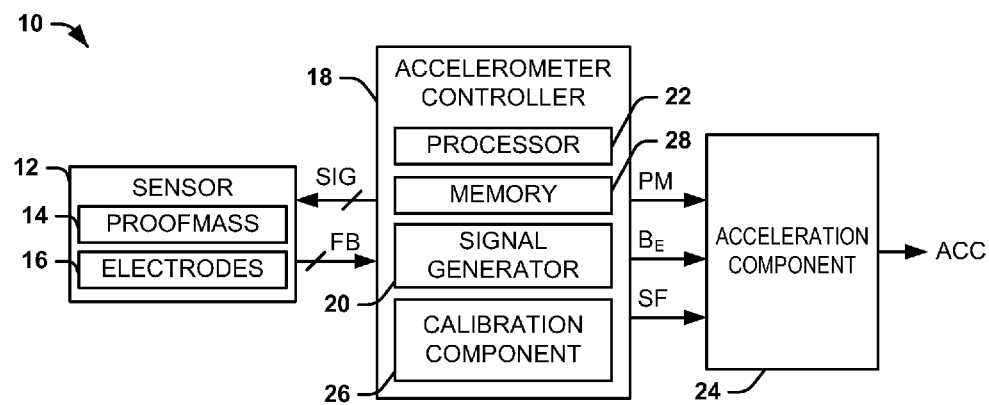
FIG. 1 illustrates an example of an accelerometer sensor system.

FIG. 1 illustrates an example of an accelerometer sensor system 10 in accordance with an aspect of the invention. The accelerometer sensor system 10 can be implemented in any of a variety of applications, such as for navigation and/or guidance systems. As an example, the accelerometer sensor system 10 can be arranged in a single integrated package, or as part of an integrated package. The accelerometer sensor system 10 can be configured to measure an external input acceleration acting upon the accelerometer sensor system 10, demonstrated in the example of FIG. 1 as a signal ACC. As described herein, an external acceleration or input acceleration is defined as an acceleration of the accelerometer sensor system 10 resulting from an external force that is applied to the accelerometer sensor system 10, and can include gravity as well as accelerations resulting from other external forces. As described herein, the accelerometer sensor system 10 can be configured to substantially mitigate scale-factor range-dependent bias error, such that the calculated acceleration ACC is substantially free from range-dependent bias induced error.

The accelerometer sensor system 10 includes a sensor 12. The sensor 12 includes a proofmass 14 and a corresponding set of electrodes 16. The proofmass 14 can be arranged such that the proofmass 14 is forced in a direction opposite the external acceleration. The accelerometer sensor system 10 also includes an accelerometer controller 18. The accelerometer controller 18 includes a signal generator 20 and a processor 22. The signal generator 20 is configured to generate control signals SIG that are provided to the respective sets of electrodes 16 for maintaining the proofmass 14 at a substantial electrical null position in a force rebalance manner. The processor 22 can thus control the signal generator 20 to implement the force rebalance of the proofmass 14, such as by adjusting one or more of an amplitude, a polarity, a duration, and a duty-cycle of the control signals SIG based on the force rebalance implementation. Therefore, the processor 22 can be configured to calculate the input acceleration of the accelerometer sensor system 10 in response to a force acting upon the proofmass 14 based on the force rebalance of the proofmass 14 to the null position. As an example, the sensor 12 and the associated electronics of the accelerometer controller 18 can be configured and are demonstrated herein as an electrostatic accelerometer system. However, it is to be understood that the sensor 12 and the associated electronics of the accelerometer controller 18 are not intended to be limited to an electrostatic accelerometer system, but could instead be implemented as a variety of other types of accelerometer systems, such as an electromagnetic accelerometer system.

As described herein, a null position can describe a rest position associated with the proofmass 14 at which the proofmass 14 is at approximately zero displacement. As an example, a mechanical null can correspond to a position of the proofmass 14 at which flexures that hold the proofmass 14 to an associated frame of the sensor 12 apply no force in either direction, and an electrical null can correspond to a position of the proofmass 14 at which the respective electrodes 16 above and below the proofmass 14 apply an approximately zero net force to the proofmass 14 relative to each other. Nominally, the mechanical null and the electrical null can correspond to the same location of the proofmass 14. However, one source of scale-factor range-dependent bias uncertainty, as described herein, can be based on a difference between the mechanical and electrical nulls, such as can result from fabrication tolerances and other sources of error. In addition, scale-factor range-dependent bias uncertainty can result from substantial mismatches between the electrodes 16 above and below the proofmass 14, such as resulting from fabrication tolerances.

As one example, the signal generator 20 can generate charge pulses (e.g., current pulses) of a substantially equal magnitude and polarity, and the processor 22 is configured to provide the charge pulses to the set of electrodes 16 in a predetermined sequence to generate electrostatic forces to accelerate the proofmass 14 toward the respective null positions (i.e., to rebalance the proofmass 14). For example, the processor 22 can alternately provide charge pulses generated by the signal generator 20 to at least one of the set of electrodes 16 then to another at least one of the set of electrodes 16 to generate alternating electrostatic forces of opposite polarity. As a result, the proofmass 14 is alternately accelerated in the first and second directions to position the proofmass 14 toward the null position at each charge pulse application. In response to an external force, the processor 22 can be configured to change a duty-cycle of the current pulses corresponding to the control signals SIG in a pulse-width modulation (PWM) manner to apply a greater rebalance force to one side of the respective proofmass 14.

As another example, the signal generator 20 and the processor 22 can implement a voltage-control scheme to implement force rebalance of the proofmass 14. For example, the signal generator 20 can apply a voltage bias signal to the proofmass 14 and can provide control voltages to each of the set of electrodes 16 (e.g., via the control signals SIG). Thus, the proofmass 14 can be substantially held at the null position based on a difference between the voltage bias signal and the control voltages at the set of electrodes 16. Alternatively, the proofmass 14 can be substantially electrically grounded, such that the signal generator 20 can be configured to apply the control voltages to the set of electrodes 16. As a result, the processor 22 can set the magnitudes and respective polarities of the control voltages at the set of electrodes 16 to provide force rebalance of the respective proofmass 14.

As a result of a capacitive coupling between the set of electrodes 16 and the respective proofmass 14, acceleration feedback signals are generated at the set of electrodes 16 that are an indication of the relative displacement of the proofmass 14. In the example of FIG. 1, the acceleration feedback signals are demonstrated as signals FB. The acceleration feedback signals FB can thus be proportional to a displacement (i.e., capacitive gap) of the proofmass 14 relative to the set of electrodes 16. Accordingly, the acceleration feedback signals FB can provide an indication of a magnitude of the relative displacement of the proofmass 14. The processor 22 can also be configured to generate a set of output signals PM based on the acceleration feedback signals FB that corresponds to the displacement of the proofmass 14 and/or a time integral of the displacement of the proofmass 14, such as resulting from an external acceleration. In the example of FIG. 1, the output signals PM are provided to an acceleration component 24. As an example, the acceleration component 24 can be configured as a Kalman filter. The acceleration component 24 can thus be configured to calculate the magnitude of the external acceleration based on the output signals PM. The calculated external acceleration is demonstrated in the example of FIG. 1 as the signal ACC.

Based on the control signals SIG that are generated by the signal generator 20, the signal generator 20 can be configured to set a scale-factor range associated with the calculation of the input acceleration. As described herein, a scale-factor range describes a range of values of the acceleration feedback signals FB between a minimum and a maximum acceleration (e.g., an absolute value maximum), such that a scale-factor can be determined for measuring the input acceleration based on values therein of the acceleration feedback signals FB. Thus, the scale-factor range or full-scale range, as described herein, corresponds to the values of the acceleration feedback signals FB of the maximum measurable accelerations that are both parallel and anti-parallel to a sensitive axis of the sensor 12. As a result, the scale-factor of a scale-factor range can be set based on the values of the acceleration feedback signals FB of the maximum measurable accelerations, such that magnitudes of the input acceleration can be interpolated to allow measurement thereof. However, at least a portion of the bias error that can provide uncertainty in the measurement of the input acceleration can be range-dependent, in that the bias error is a function of the range (e.g., the full-scale range). Such bias error can result from a variety of sources, such as fabrication mismatches and/or tolerances of the electrodes of the set of electrodes 16, or from the proofmass 14, or from the electronics in the accelerometer controller 18.

In the example of FIG. 1, the accelerometer controller 18 also includes a calibration component 26 and a memory 28. The calibration component 26 is configured to substantially mitigate the effects of the range-dependent bias error based on a difference in the calculated input acceleration in each of at least two separate scale-factor ranges. For example, the range-dependent bias error can be made observable based on changes to the scale-factor range of the sensor 12. Therefore, the calibration component 26 can command the signal generator 20 to provide the control signals SIG to the sensor 12 in a manner that changes the scale-factor range of the sensor 12, such that the range-dependent bias error can be calculated and substantially canceled from the measurement of the input acceleration. For example, the calibration component 26 can be configured to dictate timing associated with the change of scale-factor of the sensor 12, such that the calibration component 26 can be implemented for periodic calibration of the accelerometer sensor system 10 in real-time.

The scale-factor can be changed, for example, from the scale-factor associated with a first scale-factor range to a predetermined scale-factor associated with a second scale-factor range. The scale-factors can thus be saved in the memory 28. Upon the acceleration component 24 measuring the input acceleration ACC acting upon the sensor 12 in a first scale-factor range, the calibration component 26 can command the signal generator 20 to change the control signals SIG to the sensor 12, thus switching from the first scale-factor range to the second scale-factor range. Thus, the acceleration component 24 can measure the input acceleration ACC in the second scale-factor range. In the example of FIG. 1, the accelerometer controller 18 can provide the scale factor to the acceleration component 24, demonstrated as a signal SF, such that the acceleration component 24 can measure the input acceleration ACC based on the corresponding scale factor. The calibration component 26 can thus calculate an estimated range-dependent bias error $B_E$ based on the measured input acceleration ACC in each of the scale-factor ranges. As an example, the calibration component 26 can implement an algorithm that calculates the estimated range-dependent bias error $B_E$. The estimated range-dependent bias error $B_E$ can be provided to the acceleration component 24, such that the estimated range-dependent bias error can be substantially canceled from the subsequent calculation of the input acceleration ACC.

As an example, the calibration component 26 can periodically implement the algorithm based on periodic changes of the scale-factor range, such that the calibration of the accelerometer sensor system 10 can be implemented substantially continuously in real-time. For example, the periodic switching of the scale-factor range and the corresponding periodic implementation of the algorithm can occur at a sufficiently high frequency that the estimate of the range-dependent bias error can be substantially continuously calculated and canceled from substantially continuous measurements of the input acceleration. Therefore, the accelerometer sensor system 10 can implement self-calibration during nominal operation in real-time.

As a second example, the calibration component 26 can periodically implement the algorithm based on pseudo-random periodic changes of the scale-factor range, such that the calibration of the accelerometer sensor system 10 can be implemented substantially continuously in real-time under greater dynamics of input acceleration. For example, the periodic switching of the scale-factor range and the corresponding periodic implementation of the algorithm can occur with a pseudo-random atonal time period associated with each scale-factor range, such that the estimate of the range-dependent bias error can be substantially continuously calculated and canceled from substantially continuous measurements of the input acceleration in the presence of greater acceleration dynamics. In this case, the algorithm may be modified to weight each measurement and the corresponding modification of the estimate of range-dependent bias error based on the respective measurement period. Therefore, the accelerometer sensor system 10 can implement self-calibration during nominal operation in real-time.

As a third example, the calibration component 26 can periodically implement the algorithm based on pseudo-random periodic changes between more than two scale-factor ranges, such that the calibration of the accelerometer sensor system 10 can be implemented substantially continuously in real-time under greater dynamics of input acceleration. For example, the periodic switching of the scale-factor range and the corresponding periodic implementation of the algorithm can occur with a pseudo-random atonal time period associated with each scale-factor range, switching between the available scale factor ranges in a pseudo-random fashion, such that the estimate of the range-dependent bias error can be substantially continuously calculated and canceled from substantially continuous measurements of the input acceleration in the presence of substantial acceleration dynamics. In this case, the algorithm may be modified to weight each measurement and the corresponding modification of the estimate of range-dependent bias error based on the respective measurement period and the respective scale-factor range for each measurement. Therefore, the accelerometer sensor system 10 can implement self-calibration during nominal operation in real-time.

Figure 2:
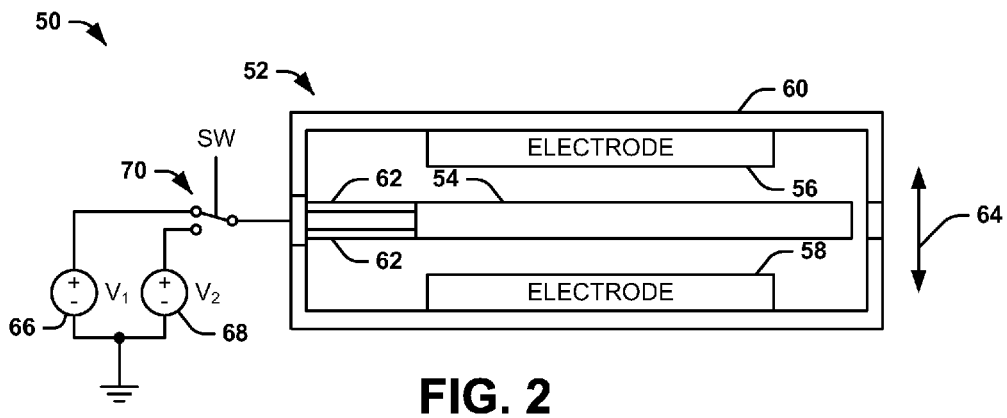
FIG. 2 illustrates an example diagram of a sensor.

As described previously, the change of the scale-factor range of the sensor 12 can be implemented based on the control signals SIG provided to the sensor 12. The manner in which the scale-factor range can be adjusted can be based on the type of force-rebalance implementation of the sensor 12. FIG. 2 illustrates an example diagram 50 of a sensor 52. As described herein, the diagram 50 demonstrates a first example of a manner in which the scale-factor range can be adjusted for a voltage-control force-rebalance implementation.

The sensor 52 can correspond to the sensor 12 in the example of FIG. 1. The sensor 52 includes a pendulous proofmass 54, a first electrode 56, and a second electrode 58. The first and second electrodes 56 and 58 are arranged on opposing surfaces of the proofmass 54, and can each be arranged as a single electrode or a set of electrodes. The proofmass 54 is coupled to a frame 60 of the sensor 52 via a set of flexures 62. The flexures 62 are configured in the example of FIG. 2 as a pair of flexures that are arranged above and below each other. Therefore, motion of the proofmass 54 up and down along an input axis 64 can be maintained in a substantially planar motion with respect to the frame 60, such that an angle between the proofmass 54 relative to the electrodes 56 and 58, which is nominally zero, can remain substantially constant to substantially avoid wedge-effects that can affect the scale-factor and/or bias of the sensor. It is to be understood, however, that the sensor 52 is not intended to be limited to the multiple flexures 62, but can instead include only a single flexure 62 for the proofmass 54. As an example, the accelerometer sensor system 10 can be fabricated in three wafer layers, such that one layer includes the proofmass 54, one that includes the first electrode 56, and one that includes the second electrode 58. Therefore, the proofmass 54, the first electrode 56, and the second electrode 58 can be fabricated as substantially process-matched components with respect to each other. The frame 60 can also be fabricated as part of these respective wafers, such as based on the respective layers to which the portions of the frame 60 are coupled.

The diagram 50 also demonstrates a first voltage source 66 that generates a voltage $V_1$ and a second voltage source 68 that generates a voltage $V_2$. The voltage sources 66 and 68 can be mutually exclusively coupled to the proofmass 54 based on a switch 70 to provide one of the voltage $V_1$ and the voltage $V_2$ to the proofmass 54 at a given time. As an example, the voltage sources 66 and 68 can be associated with the signal generator 20, such that the voltages $V_1$ and $V_2$ can be part of the control signals SIG, along with other control signals that are provided to the electrodes 56 and 58. The voltages $V_1$ and $V_2$ can have different values with respect to each other, such that the voltage $V_1$ can be associated with a first scale-factor range and the voltage $V_2$ can be associated with a second scale-factor range. The switch 70 can be controlled via a signal SW, which can be asserted and de-asserted based on a switching frequency set by the calibration component 26. Therefore, the switch 70 can alternately switch the proofmass 54 between a voltage potential of the voltage $V_1$ to set the first scale-factor range of the sensor 52 and a voltage potential of the voltage $V_2$ to set the second scale-factor range of the sensor 52. Accordingly, for each setting of the proofmass 54 to the respective voltages $V_1$ and $V_2$, the input acceleration can be measured along the sensitive axis 64, and the estimated range-dependent bias error can be calculated based on the respective values of the input acceleration at each of the first and second scale-factor ranges set by the respective voltages $V_1$ and $V_2$. While the example of FIG. 2 demonstrates two separate voltage sources 66 and 68, it is to be understood that the voltages $V_1$ and $V_2$ could instead be generated by a single voltage source that is switched to and from a voltage-divider to provide the separate voltage for the corresponding separate scale-factor range.

Figure 3:
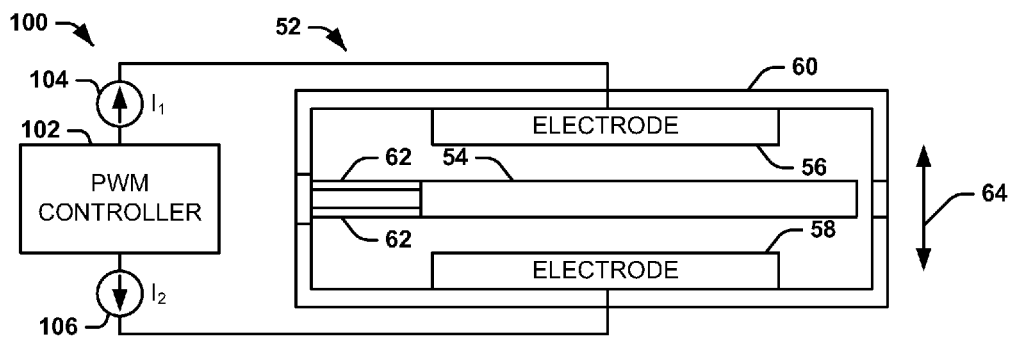
FIG. 3 illustrates another example diagram of a sensor.

FIG. 3 illustrates an example diagram 100 of the sensor 52. As described herein, the diagram 100 demonstrates a second example of a manner in which the scale-factor range can be adjusted for a charge-control force-rebalance implementation. In the example of FIG. 3, the sensor 52 can be fabricated and arranged substantially the same as the sensor 52 in the example of FIG. 2. Thus like reference numbers are provided in the description of the example of FIG. 3 as was provided in the description of the example of FIG. 2.

The diagram 100 demonstrates a PWM controller 102, a first current source 104 that generates a current $I_1$, and a second current source 106 that generates a current $I_2$. The current sources 104 and 106 are demonstrated as applying the respective currents $I_1$ and $I_2$ to the electrodes 54 and 56 based on the PWM controller 102. Thus, the currents $I_1$ and $I_2$ can be controlled by the PWM controller 102 to generate charge pulses at the respective electrodes 56 and 58 to implement force-rebalancing of the proofmass 54. As an example, the PWM controller 102 can be controlled by the signal generator 20. Thus, the signal generator 20 can control the currents $I_1$ and $I_2$ via the PWM controller 102 to set the sensor 52 between the first scale-factor range and the second scale-factor range, such as based on a magnitude or duration of the currents $I_1$ and $I_2$ as applied to the respective electrodes 56 and 58. Accordingly, for each setting of the first scale-factor range and the second scale-factor range, the input acceleration can be measured along the sensitive axis 64, and the estimated range-dependent bias error can be calculated based on the respective values of the input acceleration at each of the first and second scale-factor ranges set by the currents $I_1$ and $I_2$.

Figure 4:
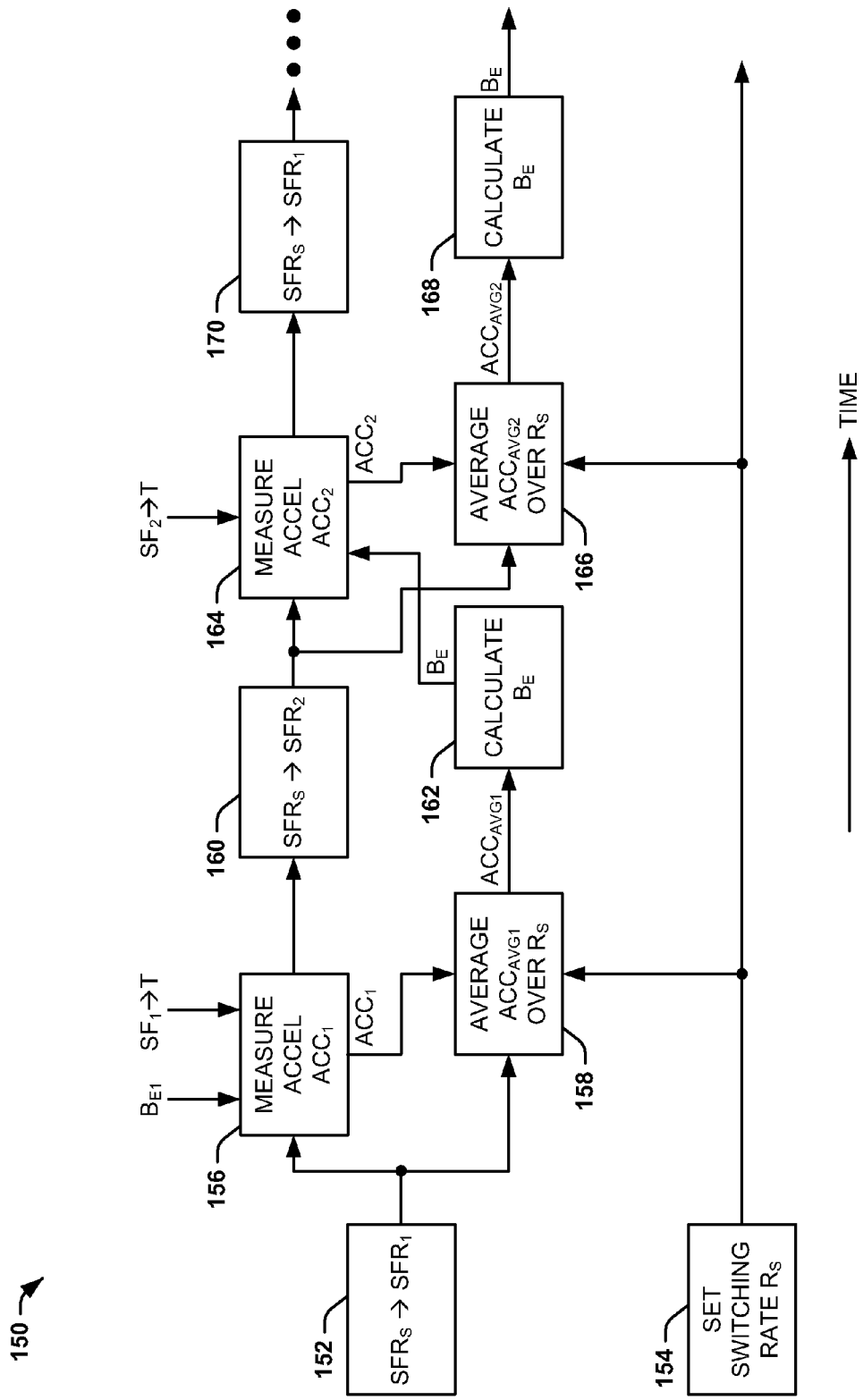
FIG. 4 illustrates an example of an accelerometer calibration algorithm.

FIG. 4 illustrates an example of an accelerometer calibration algorithm 150. The calibration algorithm 150 in the example of FIG. 4 can be implemented to calculate an estimated scale-factor range-dependent bias error in real-time for the accelerometer sensor system 10 in the example of FIG. 1. Therefore, reference is to be made to the example of FIG. 1 in the following description of the example of FIG.

4. As is described in greater detail herein, the accelerometer calibration algorithm 150 can be performed during nominal operation of the accelerometer sensor system 10 in real-time in an iterative manner to maintain the magnitude of the estimated range-dependent bias error at approximately zero. In addition, the accelerometer calibration algorithm 150 is demonstrated left-to-right in the example of FIG. 4 over time, such that steps that are farther left than other steps are performed in that order in time, and steps that are substantially aligned from left-to-right in the example of FIG. 4 can be performed substantially concurrently.

At a step 152, the scale-factor range $SFR_S$ of the sensor 10 is set for a first scale-factor range $SFR_1$. As an example, the first scale-factor range $SF_1$ can be set based on changing a voltage that is applied to the proofmass 14, such as described in the example of FIG. 2, or based on changing a time duration of applied currents to the electrodes 16, such as described in the example of FIG. 3. Substantially concurrently, at a step 154, a switching rate $R_S$ is set by the calibration component 26. For example, the switching rate $R_S$ can be set at a substantially high frequency to facilitate continuous real-time measurement of the input acceleration and continuous real-time calculation of the estimated range-dependent bias error. As another example, the switching rate $R_S$ can be set to an exponential number of pulse-rebalance cycles, such as a number $2^X$ of pulse-rebalance cycles, where X is an integer. This can optimize the algorithm for calculation speed and ease of implementation in digital electronics. For example, by implementing the switching rate $R_S$ as an exponential number of pulse-rebalance cycles, summation takes fewer calculation steps than does averaging, and dividing a number by an integer power of two takes fewer calculation steps than dividing a number by a different arbitrary number (i.e. not an integer power of two).

At a step 156, the input acceleration is measured in the first scale-factor range $SFR_1$. In the example of FIG. 4, the measured input acceleration in the first scale factor range $SFR_1$ is demonstrated as $ACC_1$. The measurement of the input acceleration $ACC_1$ is performed by the acceleration component 24 based on a previously calculated estimated range-dependent bias error $B_{E1}$ and a scale-factor $SF_1$ that is associated with the first scale-factor range $SFR_1$. The estimated range-dependent bias error $B_{E1}$ can be based on a previous calculation of the estimated range-dependent bias error $B_E$, such as from a prior iteration of the accelerometer calibration algorithm 150, or could be based on an initial predetermined estimate. The scale-factor $SF_1$ can be modeled over temperature, such as during a testing phase of the accelerometer sensor system 10. For example, the sensor 12 can undergo a tumble test during a pre-calibration procedure. As an example, the pre-calibration procedure can include the sensor 12 being subjected to each of +1 g and −1 g forces, respectively, for a predetermined time duration at each of a plurality of discrete intervals in a predetermined range of temperatures (e.g., between approximately −55° C. through approximately +85° C.). The scale-factors modeled over temperature can thus be stored in the memory 28, such that the scale-factors modeled over temperature can be accessed during the calibration algorithm 150.

At a step 158, the measured input acceleration $ACC_1$ is averaged over the switching rate $R_S$ to generate an average acceleration $ACC_{AVG1}$. The measured acceleration $ACC_1$ in the respective scale factor $SF_1$ can be averaged to generate the average acceleration value $ACC_{AVG1}$ to average the effects of noise and acceleration dynamics over a period of time. At a step 160, the scale-factor range $SFR_S$ of the sensor 10 is switched from the first scale-factor range $SFR_1$ to a second scale-factor range $SFR_2$. As an example, the second scale-factor range $SFR_2$ can be set based on changing the voltage that is applied to the proofmass 14, such as described in the example of FIG. 2, or based on changing the time duration of applied currents to the electrodes 16, such as described in the example of FIG. 3.

As another example, the measurement of the estimated range-dependent bias error $B_{E1}$ in the step 156 and the averaging of the measured input acceleration $ACC_1$ to generate an average acceleration $ACC_{AVG1}$ can be based on the number of pulse-rebalance cycles. For example, the estimated range-dependent bias error $B_{E1}$ can be divided by the switching rate $R_S$ (e.g., $2^X$ pulse-rebalance cycles), and the average acceleration $ACC_{AVG1}$ can be generated as a sum of measurements of the acceleration $ACC_1$ at each of the pulse-rebalance cycles (e.g. the sum of $2^X$ measurements of $ACC_1$). In this example, the estimated range-dependent bias error $B_{E1}$ is representative of a net sum of the estimated range-dependent bias error associated with $2^X$ measurements of acceleration, and is thus equal to $2^X$ times the average range-dependent bias error.

At a step 162, the estimated range-dependent bias error $B_E$ is calculated by the calibration component 26 based on the average acceleration $ACC_{AVG1}$. While the step 162 is demonstrated as being performed after the step 160, it is to be understood that the step 162 can be performed before or concurrently with the step 160. As one example, the calculation of the estimated range-dependent bias error $B_E$ can be based on an algorithm that calculates the estimated range-dependent bias error $B_E$ based on a proportional relationship between the average acceleration calculated in the first and second scale factor ranges. For example, in a charge-controlled force-rebalance implementation, the estimated range-dependent bias error $B_E$ can be calculated as follows:

$$\frac{\left(1 - \frac{(ACC_{AVG1} + B_{E1})}{\left(ACC_{AVG2} * \frac{SF_1}{SF_2} + \left(B_{E1} * \frac{SF_1}{SF_2}\right)\right)}\right) * G_1 + B_{E1} * G_2}{G_2} = B_E; \quad \text{Equation 1}$$

where: $ACC_{AVG2}$ is an average acceleration calculated in the second scale factor range $SFR_2$;
$SF_1$ is the scale factor associated with the first scale-factor range $SFR_1$;
$SF_2$ is a second scale factor associated with the second scale-factor range $SFR_2$;
$G_1$ is a first tunable gain constant; and
$G_2$ is a second tunable gain constant.

As another example, for a voltage-controlled force-rebalance implementation, the estimated range-dependent bias error $B_E$ can be calculated as follows:

$$\frac{\left(1 - \frac{(ACC_{AVG1} + B_{E1})}{\left(ACC_{AVG2} * \frac{SF_1}{SF_2} + \left(B_{E1} * \left(\frac{SF_1}{SF_2} * c + \left(\frac{SF_1}{SF_2}\right)^2\right)\right)\right)}\right) * G_1 + B_{E1} * G_2}{G_2} = B_E; \quad \text{Equation 2}$$

where: c is a charge constant.
The gain constants $G_1$ and $G_2$ can be tuned, along with the switching rate $R_S$, to modify the responsivity of Equations 1 and 2. For example, the first gain constant $G_1$ modifies the integral gain, such that higher values of the first gain constant $G_1$ can increase the responsivity of Equations 1 and 2 with respect to changes in the range-dependent bias error. As another example, the second gain constant $G_2$ modifies the integration time, such that higher values of the second gain constant $G_2$ can increase the integration time for averaging the effects of noise and acceleration dynamics.

As another example, the calculation of the estimated range-dependent bias error $B_E$ can be based on an algorithm that calculates the estimated range-dependent bias error $B_E$ based on a difference between the average acceleration calculated in the first and second scale factor ranges. For example, in a charge-controlled force-rebalance implementation, the estimated range-dependent bias error $B_E$ can be calculated as follows:

$$ACC_{AVG2} * \left(\frac{SF_1}{SF_2}\right) + B_{E1} * \left(\frac{SF_1}{SF_2}\right) - ACC_{AVG1} = B_E \quad \text{Equation 3}$$

As another example, for a voltage-controlled force-rebalance implementation, the estimated range-dependent bias error $B_E$ can be calculated as follows:

$$ACC_{AVG2} * \left(\frac{SF_1}{SF_2}\right) + B_{E1} * \left(\frac{SF_1}{SF_2}\right)^2 - ACC_{AVG1} = B_E \quad \text{Equation 4}$$

The calculation of the estimated range-dependent bias error $B_E$ using Equations 3 and 4 can result in an actual calculation of the estimated range-dependent bias error $B_E$, as opposed to an iterative calculation of a correction factor that is added to the estimated range-dependent bias error $B_E$. As an example, the estimated range-dependent bias error $B_E$ can be calculated using Equations 3 and 4 every time the average acceleration $ACC_{AVG1}$ or $ACC_{AVG2}$ is updated, or can be calculated until the estimated range-dependent bias error $B_E$ converges to a given value. For example, Equation 5 can have a time constant that is equal to 2.2 times the amount of time required to complete the number of pulse-rebalance cycles (e.g., $2^X$ pulse-rebalance cycles). The calculation of the estimated range-dependent bias error $B_E$ using Equation 3 is much less computationally complex than calculating the estimated range-dependent bias error $B_E$ using Equations 1 and 2 based on less division. Thus, Equation 3 can utilize less processing power, such as in a field-programmable gate array (FPGA). In addition, the calculation of the estimated range-dependent bias error $B_E$ using Equation 3 can be implemented in fewer iterations than Equations 1 and 2.

As another example, the estimated range-dependent bias error $B_E$ can be calculated based on iteratively calculating a correction factor that is added to the estimated range-dependent bias error $B_E$, such as follows:

$$G_1 * \left(ACC_{AVG2} * \frac{SF_1}{SF_2} + B_{E1} * \left(1 - \frac{SF_1}{SF_2}\right) - ACC_{AVG1}\right) + B_{E1} = B_E \quad \text{Equation 5}$$

As an example, the estimated range-dependent bias error $B_E$ can be calculated using Equation 5 every time the average acceleration $ACC_{AVG1}$ or $ACC_{AVG2}$ is updated, or can be calculated until the estimated range-dependent bias error $B_E$ converges to a given value. The gain constant $G_1$ can be tuned, along with the switching rate $R_S$, to modify the responsivity of Equation 5. In Equation 5, the gain constant $G_1$ is less than one and greater than zero to provide incremental corrections to the estimated range-dependent bias error $B_E$ that can converge on a solution for the estimated range-dependent bias error $B_E$. For example, Equation 5 can have a time constant that is equal to 2.2 divided by the gain constant $G_1$ times the amount of time required to complete the number of pulse-rebalance cycles (e.g., $2^X$ pulse-rebalance cycles). Thus, similar to as described previously regarding Equations 3 and 4, Equation 5 can be implemented to calculate the estimated range-dependent bias error $B_E$ in a much less computationally complex manner and with substantially fewer iterations than calculating the estimated range-dependent bias error $B_E$ using Equations 1 and 2.

As yet another example, the calculation of the estimated range-dependent bias error $B_E$ can be based on an algorithm that calculates the net sum of estimated range-dependent bias error $B_E$ based on a difference between the acceleration calculated in the first and second scale factor ranges $SFR_1$ and $SFR_2$. This version of the algorithm can utilize, for example, a net sum of $2^X$ individual acceleration measurements $ACC_1$ and $ACC_2$, respectively, rather than their respective averages $ACC_{AVG1}$ and $ACC_{AVG2}$, such that only one division step is required and computational loads are further reduced. For example, in a charge-controlled force-rebalance implementation, the estimated range-dependent bias error $B_E$ can be calculated as follows:

$$\left(ACC_2 * \left(\frac{SF_1}{SF_2}\right) + 2^X * B_{E1} * \left(\frac{SF_1}{SF_2}\right) - ACC_1\right) / 2^X = B_E \quad \text{Equation 6}$$

As another example, for a voltage-controlled force-rebalance implementation, the estimated range-dependent bias error $B_E$ that implements individual acceleration measurements $ACC_1$ and $ACC_2$, respectively, rather than their respective averages $ACC_{AVG1}$ and $ACC_{AVG2}$, can be calculated as follows:

$$\left(ACC_2 * \left(\frac{SF_1}{SF_2}\right) + 2^X * B_{E1} * \left(\frac{SF_1}{SF_2}\right)^2 - ACC_1\right) / 2^X = B_E \quad \text{Equation 7}$$

At a step 164, the input acceleration is measured in the second scale-factor range $SFR_2$. In the example of FIG. 4, the measured input acceleration in the second scale factor range $SFR_2$ is demonstrated as $ACC_2$. The measurement of the input acceleration $ACC_2$ is performed by the acceleration component 24 based on a scale-factor $SF_2$ that is associated with the second scale-factor range $SFR_2$ and based on the estimated range-dependent bias error $B_E$ that is calculated in the step 162, which thus becomes the previous estimated range-dependent bias error $B_{E1}$ for subsequent calculation of the estimated range-dependent bias error $B_E$. At a step 166, the measured input acceleration $ACC_2$ is averaged over the switching rate $R_S$ to generate an average acceleration $ACC_{AVG2}$. The steps 164 and 166 can thus be implemented substantially similar to the steps 156 and 158 described previously.

At a step 168, the estimated range-dependent bias error $B_E$ is again calculated by the calibration component 26 based on the average accelerations $ACC_{AVG1}$ and $ACC_{AVG2}$, and based on the previously calculated estimated range-dependent bias error $B_E$. At a step 170, the scale-factor range $SFR_S$ of the sensor 10 is set back to the first scale-factor range SFR₁, and the calibration procedure repeats itself iteratively based on repeating the steps 152 through 168. The value of the estimated range-dependent bias error $B_E$ is thus continuously calculated in real-time, with the value of the estimated range-dependent bias error $B_E$ being subtracted from future measurements of the input acceleration ACC. As a result, the value of the estimated range-dependent bias error $B_E$ converges to approximately zero at a steady state of the input acceleration ACC. Accordingly, continuous implementation of the calibration procedure by the calibration component 26 in real-time can substantially continuously remove scale-factor range-dependent bias error from the measurement of the input acceleration ACC to provide greater accuracy of the accelerometer sensor system 10.

The calibration and self-calibration procedures described herein can be implemented for a variety of accelerometer systems that can provide for bi-directional measurement of acceleration and that includes associated electronic systems that mechanize the operation of the respective accelerometer system in such a way as to generate bias error in the instrument as a function of the interaction of the electronics implementation (i.e., the mechanization) with the physical sensitive element (e.g., the sensor 12). Examples of appropriate mechanizations of the accelerometer sensor system 10 can include voltage pulse-width modulation, electrical charge pulse-width modulation, electrical current pulse-width modulation, and pulse-density modulation of voltage, charge, or current. Thus, the accelerometer sensor system 10 can implement the calibration and self-calibration procedures described herein based on the capability of modifying the mechanization in a controlled, repeatable, and ratiometric fashion. As an example, in the case of pulse-width modulation of electrical current, the electronics can be capable of division of that electrical current by a repeatable ratio. Based on the capacity of the accelerometer controller 18 to implement the calibration component 26 to provide the calibration and self-calibration procedures described herein, the accelerometer sensor system 10 can utilize any of a variety of standard sensors (e.g., the sensor 12) for the calibration and self-calibration procedures described herein.

Figure 5:
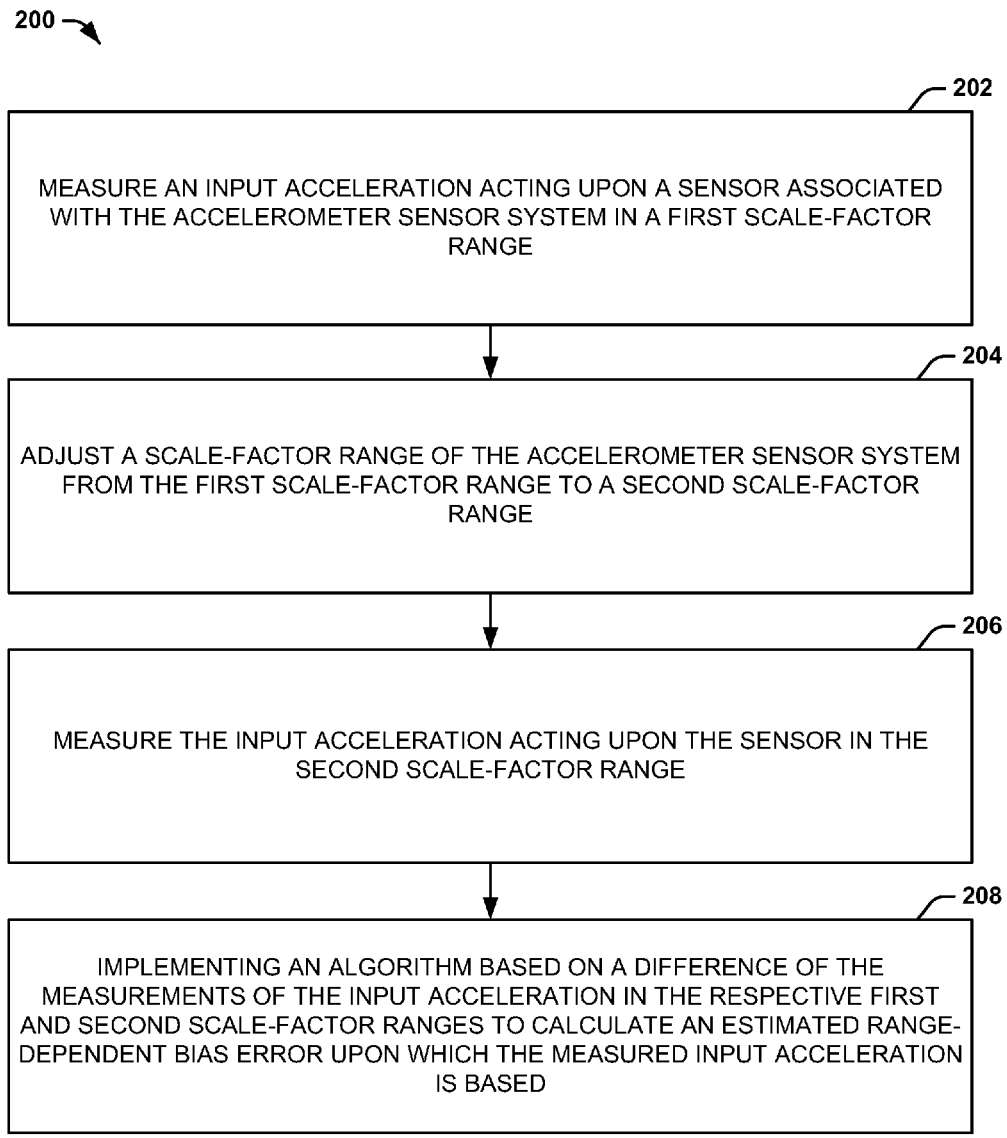
FIG. 5 illustrates an example of a method for calibrating an accelerometer sensor system.

In view of the foregoing structural and functional features described above, a methodology in accordance with various aspects of the present invention will be better appreciated with reference to FIG. 5. While, for purposes of simplicity of explanation, the methodology of FIG. 5 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 5 illustrates an example of a method 200 for calibrating an accelerometer sensor system. At 202, an input acceleration acting upon a sensor (e.g., the sensor 12) associated with the accelerometer sensor system (e.g., the accelerometer sensor system 10) is measured (e.g., by the acceleration component 24) in a first scale-factor range (e.g., the scale-factor range SFR₁). At 204, a scale-factor range of the accelerometer sensor system is adjusted from the first scale-factor range to a second scale-factor range (e.g., the scale-factor range SFR₂). At 206, the input acceleration acting upon the sensor is measured in the second scale-factor range. At 208, an algorithm (e.g., Equation 1 or Equation 2) is implemented based on a difference of the measurements of the input acceleration in the respective first and second scale-factor ranges to calculate an estimated range-dependent bias error (e.g., the estimated range-dependent bias error $B_E$) upon which the measured input acceleration is based.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An accelerometer sensor system comprising:
a sensor comprising a proofmass and electrodes and being configured to generate acceleration feedback signals based on control signals applied to the electrodes in response to an input acceleration;
an acceleration component configured to measure the input acceleration based on the acceleration feedback signals; and
an acceleration controller configured to generate the control signals to define a first scale-factor range associated with the sensor and to define a second scale-factor range associated with the sensor, the control system comprising a calibration component configured to calibrate the accelerometer sensor system with respect to range-dependent bias error based on a difference between the measured input acceleration at each of the first scale-factor range and the second scale-factor range, wherein the measured input acceleration at each scale-factor range corresponds to a net sum of measured input accelerations.

2. The system of claim 1, wherein the control signals are configured as a bias voltage signal that is provided to the proofmass and as control voltage signals provided to the electrodes, wherein the acceleration controller is configured to change the scale-factor range associated with the sensor between the first scale-factor range and the second scale-factor range based on switching the bias voltage signal between a first predetermined magnitude and a second predetermined magnitude, respectively.

3. The system of claim 1, wherein the control signals are configured as pulse-width modulation (PWM) current signals that are provided to the electrodes, wherein the acceleration controller is configured to change the scale-factor range associated with the sensor between the first scale-factor range and the second scale-factor range based on changing a time duration to which the PWM current signals are applied to the electrodes between a first time duration and a second time duration, respectively.

4. The system of claim 1, wherein the calibration component is configured to substantially continuously calibrate the accelerometer sensor system with respect to the range-dependent bias error in real-time.

5. The system of claim 4,
wherein the acceleration controller is configured to switch between the first scale-factor range and the second scale-factor range at predetermined time intervals, wherein the acceleration component is configured to measure an exponential number of input accelerations at each of the first scale-factor range and the second scale-factor range, wherein the exponential number is $2^x$, wherein X is an integer greater than one; and wherein the calibration component is configured to implement an algorithm at each of the predetermined time intervals to:
sum the measured input accelerations to generate a net sum of measured input accelerations; and
calculate an estimated range-dependent bias error based on the net sum of measured input acceleration at each of the first scale-factor range and the second scale-factor range.

6. The system of claim 5, wherein the calibration component is configured to continuously implement the algorithm to substantially continuously maintain the range-dependent bias error at approximately zero.

7. The system of claim 5, wherein the acceleration component is configured to substantially subtract the estimated range-dependent bias error from the measured input acceleration.

8. The system of claim 1, wherein the calibration component is configured to implement an algorithm to calculate the estimated range-dependent bias error based on the measured input acceleration at each of the first scale-factor range and the second scale-factor range, wherein the acceleration component is configured to substantially subtract the estimated range-dependent bias error from the measured input acceleration.

9. The system of claim 8, wherein the algorithm is expressed as one of:

$$\left(ACC_2 * \left(\frac{SF_1}{SF_2}\right) + 2^X * B_{E1} * \left(\frac{SF_1}{SF_2}\right) - ACC_1\right) / 2^X = B_E; \text{ and}$$

$$\left(ACC_2 * \left(\frac{SF_1}{SF_2}\right) + 2^X * B_{E1} * \left(\frac{SF_1}{SF_2}\right)^2 - ACC_1\right) / 2^X = B_E$$

wherein: $B_E$ is the calculated range-dependent bias error;
$B_{E1}$ is a previously calculated estimated range-dependent bias error $B_E$;
$ACC_1$ is the measured input acceleration at the first scale-factor range;
$ACC_2$ is the measured input acceleration at the second scale-factor range;
$SF_1$ is a first scale factor associated with the first scale-factor range;
$SF_2$ is a second scale factor associated with the second scale-factor range;
X is an integer greater than one.

10. The system of claim 8, wherein the calibration component is further configured to periodically implement the algorithm based on commanding the signal generator to implement periodic pseudo-random changes to a time duration associated with each of the first and second scale-factor ranges, and is further configured to provide weight factors to the measurements of the input acceleration based on the periodic pseudo-random changes to the time duration.

11. The system of claim 8, wherein the calibration component is further configured to periodically implement the algorithm based on commanding the signal generator to implement periodic pseudo-random changes between the first scale-factor range, the second scale-factor range, and at least one additional scale-factor range, and is further configured to provide weight factors to the measurements of the input acceleration based on the periodic pseudo-random changes between the first, second, and at least one additional scale-factor ranges.

12. An integrated package comprising the accelerometer sensor system of claim 1.

13. A method for calibrating an accelerometer sensor system, the method comprising:
measuring input accelerations acting upon a sensor associated with the accelerometer sensor system in a first scale-factor range;
adjusting a scale-factor range of the accelerometer sensor system from the first scale-factor range to a second scale-factor range;
measuring the input accelerations acting upon the sensor in the second scale-factor range;
implementing an algorithm to calculate an estimated range-dependent bias error by:
summing the measured input accelerations in respective first and second scale factor ranges to generate a first and a second net sum of measured input accelerations; and
calculating the estimated range-dependent bias error based on a difference between the first and the second net sum of measured input accelerations.

14. The method of claim 13, further comprising:
adjusting the scale-factor range of the accelerometer sensor system from the second scale-factor range to the first scale-factor range;
re-measuring the input accelerations in the first scale-factor range;
adjusting the scale-factor range of the accelerometer sensor system from the first scale-factor range to the second scale-factor range;
re-measuring the input accelerations in the second scale-factor range; and
implementing the algorithm to calculate an updated value of the estimated range-dependent bias error by:
summing the re-measured input accelerations in respective first and second scale factor ranges to generate a first-re-measured and a second-re-measured net sum of measured input accelerations; and
calculating the updated value of the estimated range-dependent bias error based on the first-re-measured and the second-re-measured net sum of measured input accelerations and based on the estimated range-dependent bias error.

15. The method of claim 14, wherein implementing the algorithm comprises repeatedly implementing the algorithm based on continuously re-measuring the input acceleration in each of the respective first and second scale-factor ranges and continuous estimates of range-dependent bias error to maintain a substantially zero magnitude of the estimated range-dependent bias error.

16. An accelerometer sensor system comprising:
a sensor comprising a proofmass and electrodes and being configured to generate acceleration feedback signals based on control signals applied to the electrodes in response to an input acceleration;
an acceleration component configured to measure the input acceleration based on the acceleration feedback signals and an estimated range-dependent bias error; and
an acceleration controller configured to generate the control signals to define a first scale-factor range associated with the sensor and to define a second scale-factor range associated with the sensor,
the control system comprising a calibration component configured to substantially continuously calibrate the accelerometer sensor system with respect to range-dependent bias error by calculating the estimated range-dependent bias error in real-time based on a difference between the measured input acceleration at each of the first scale-factor range and the second scale-factor range and subtracting the estimated range-dependent bias error from the measured input acceleration, wherein the measured input acceleration at each scale-factor range corresponds to a net sum of measured input accelerations.

17. The system of claim 16, wherein the control signals are configured as a bias voltage signal that is provided to the proofmass and as control voltage signals provided to the electrodes, wherein the acceleration controller is configured to change the scale-factor range associated with the sensor between the first scale-factor range and the second scale-factor range based on switching the bias voltage signal between a first predetermined magnitude and a second predetermined magnitude, respectively.

18. The system of claim 16, wherein the control signals are configured as pulse-width modulation (PWM) current signals that are provided to the electrodes, wherein the acceleration controller is configured to change the scale-factor range associated with the sensor between the first scale-factor range and the second scale-factor range based on changing a time duration to which the PWM current signals are applied to the electrodes between a first time duration and a second time duration, respectively.

19. The system of claim 17, wherein the acceleration controller is configured to switch between the first scale-factor range and the second scale-factor range at each of predetermined time intervals, wherein the acceleration component is configured to measure input accelerations at each of the first scale-factor range and the second scale-factor range, and wherein the calibration component is configured to implement an algorithm at each of the predetermined time intervals to sum the measured input accelerations to generate a net sum of measured input accelerations, calculate an estimated range-dependent bias error based on the net sum of measured input acceleration at each of the first scale-factor range and the second scale-factor range, and to continuously implement the algorithm to substantially continuously maintain the range-dependent bias error at approximately zero.

20. The system of claim 17, wherein the calibration component is configured to implement an algorithm to calculate an estimated range-dependent bias error based on the measured input acceleration at each of the first scale-factor range and the second scale-factor range.

\* \* \* \* \*